United States Patent [19]

Yamaguchi et al.

[11] Patent Number: 4,791,815
[45] Date of Patent: Dec. 20, 1988

[54] CYCLICALLY DRIVEN GYRO AND ADJUSTING SYSTEM THEREFOR

[75] Inventors: Hiroshi Yamaguchi, Kadoma; Suzushi Kimura, Toyonaka; Yoshitake Hayashi, Kawachinagano, all of Japan

[73] Assignee: Matsushita Electric Industrial Co., Ltd., Osaka, Japan

[21] Appl. No.: 33,761

[22] Filed: Apr. 3, 1987

[30] Foreign Application Priority Data

Apr. 11, 1986 [JP] Japan .................................. 61-84534
May 29, 1986 [JP] Japan .................................. 61-123907

[51] Int. Cl.$^4$ ........................ G01P 9/04; G01P 21/00
[52] U.S. Cl. ............................................ 73/505; 73/1 D
[58] Field of Search .............. 73/505, 510, 1 D, 1 DV

[56] References Cited

U.S. PATENT DOCUMENTS

| | | | |
|---|---|---|---|
| 3,830,091 | 8/1974 | Sinsky | 73/1 D |
| 4,566,327 | 1/1986 | Rider | 73/510 |
| 4,590,801 | 5/1986 | Merhav | 73/505 |
| 4,628,734 | 12/1986 | Watson | 73/505 |

Primary Examiner—John Chapman
Attorney, Agent, or Firm—Wenderoth, Lind & Ponack

[57] ABSTRACT

A gyro which realizes a small error response to a disturbance inertia such as vibration, impact, etc. and an adjusting system thereof has a pair of mass elements which are cyclically driven symmetrically. A pair of sensors independently detect forces produced in response to an input angular rate and generate a pair of detection outputs. An adjustable adder synthesizes components proportional to the disturbance inertia contained in the detection outputs with an optimum addition ratio so that they are mutually completely cancelled and generates a synthesized output. A signal processing circuit processes the synthesized output to generate an output proportional to the input angular rate. The adjusting system applies to the gyro in an operating condition a disturbance vibration in the vicinity of the drive frequency of the gyro. By adjusting the addition ratio of the adjustable adder in a manner so as to make the response at this time a minimum, the best characteristic can be obtained.

3 Claims, 4 Drawing Sheets

CYCLICALLY DRIVEN GYRO AND ADJUSTING SYSTEM THEREFOR

BACKGROUND OF THE INVENTION

1. Field of the Invention

The present invention relates to a gyro for detecting an inertial angular rate of an object and more particularly to cyclically driven gyro which cyclically vibrates the mass in a vibration or rotation system.

2. Description of the Prior Art

The most traditional gyro apparatus is the type that detects a torque which acts in proportion to the vector product of an angular momentum of a rotor and an imputted angular rate around an axis perpendicular to the rotary axis of the rotor. Since this type of apparatus uses a complicated mechanism for detecting the torque which acts upon the supporting shaft of the rotor while rotating the rotor and is required to have a high precision, there are drawbacks such that the apparatus has to be made large in size and becomes expensive.

On the other hand, there has been proposed recently a system that cyclically drives a mass in the form of vibration or rotation and detects the Coriolis force which acts in proportion to the vector product of its driving rate and an input angular rate. In this system, a demodulation means is required to modulate the input angular rate by the cyclically driven vibration. However, compared with the traditional system using a rotating rotor, a drastic simplification in mechanism can be expected, so that it becomes possible to realize a reduction in size and cost.

As a cyclically driven gyro, there have so far been available a type that electromagnetically detects a deflection caused by a Coriolis force acting at the foremost end of an electromagnetically vibrated cantilever when an inertial angular rate is inputted, a type that utilizes piezoelectric effect for either one or both of the excitation and the detection (U.S. Pat. No. 2,544,646), a type that picks up a Coriolis force acting on a cyclically driven cantilever form piezoelectric element (U.S. Pat. No. 2,716,893), etc.

As one of the problems in such apparatuses, there is a response to a disturbance inertia. That is to say, a disturbance inertia when applied to the apparatus acts upon the above mass element to provide an error output.

Accordingly, the key point to constitute the apparatus is how to separate the component proportional to the Coriolis force and the component proportional to disturbance inertia from the deflection detection signal which is a response to the force which acts upon the mass element. In this case, since the Coriolis force is proportional to the vector product of the input inertial angular rate and the driving rate, the Coriolis force which acts on the mass element acts in the direction crossing at right angles with both of the instantaneous driving rate and the input inertial angular rate.

Therefore, a cyclically driven gyro may be constructed such that a pair of mass elements are driven symmetrically in reverse directions to each other and the outputs obtained by detecting the forces acting in the reverse directions are added so that the component proportional to the Coriolis force is added and the component proportional to the disturbance inertia is cancelled. As the result, it becomes possible to reduce the error response to the disturbance inertia.

In this case, the extent of the cancellation effect is determined by the balance of the sensitivities to the forces acting upon the two mass elements. That is to say, if the respective sensitivities are fully balanced, the error response to the disturbance inertia becomes zero, but if there is an imbalance between the two, there occurs an error response which is proportional thereto. When the cancellation effect at this time is compared with the case where the mass element and the detection means are independently provided, in the case that a 10% imbalance exists, the cancellation effect becomes approximately 1/20 because the component proportional to the Coriolis force becomes about twofold while the component proportional to the disturbance inertia becomes about 1/10, and in case of 1% imbalance, the cancellation effect becomes approximately 1/200 likewise.

Accordingly, when it is desired to suppress the response to the disturbance inertia, the imbalance must be reduced.

The effort made to reduce the imbalance in the conventional gyro of this kind was solely to improve symmetricity in the constituting elements. That is to say, attempt has been made to equalize the settings of the mass elements as well as the pickups for detecting the forces acting thereon as precisely as possible.

However, to seek a high precision for each of the constituting elements in this manner inevitably leads to a rise in product cost, reduction in yield, etc. The balance that would be attained even with such sacrifices is limited; it is difficult to obtain the desired characteristics; and it may, in some cases, be necessary to provide a very delicate arrangement which is very difficult.

SUMMARY OF THE INVENTION

The primary object of the present invention is to provide a cyclically driven gyro which does not require any special care for attachment and which can realize a lower sensitivity to a disturbance inertia without necessitating any special precision of its elements.

In order to attain this object, the present invention provides an adjustable addition means which can add with a desired ratio the outputs obtained by detecting the forces acting on each of a pair of symmetrically driven mass elements, so that it is possible to eliminate the components proportional to the disturbance inertia contained in the detected output at a high precision without being limited by the imbalance of the pair of elements.

The secondary object of the present invention is to provide an adjusting system which simply and precisely provides an optimum addition ratio to the above gyro.

In order to attain this object, the adjusting system is arranged to place the gyro in an operating condition, vibrate it at a frequency near its drive frequency and adjust the above addition in such a manner as to minimize make the error output, at that time or to reduce it to a value which is within an allowable range. According to such a system, due to the possibility of adjustment to the most sensitive input of the device, it is possible to obtain a desired characteristic efficiently.

DESCRIPTION OF THE PREFERRED EMBODIMENTS

Figure 1:
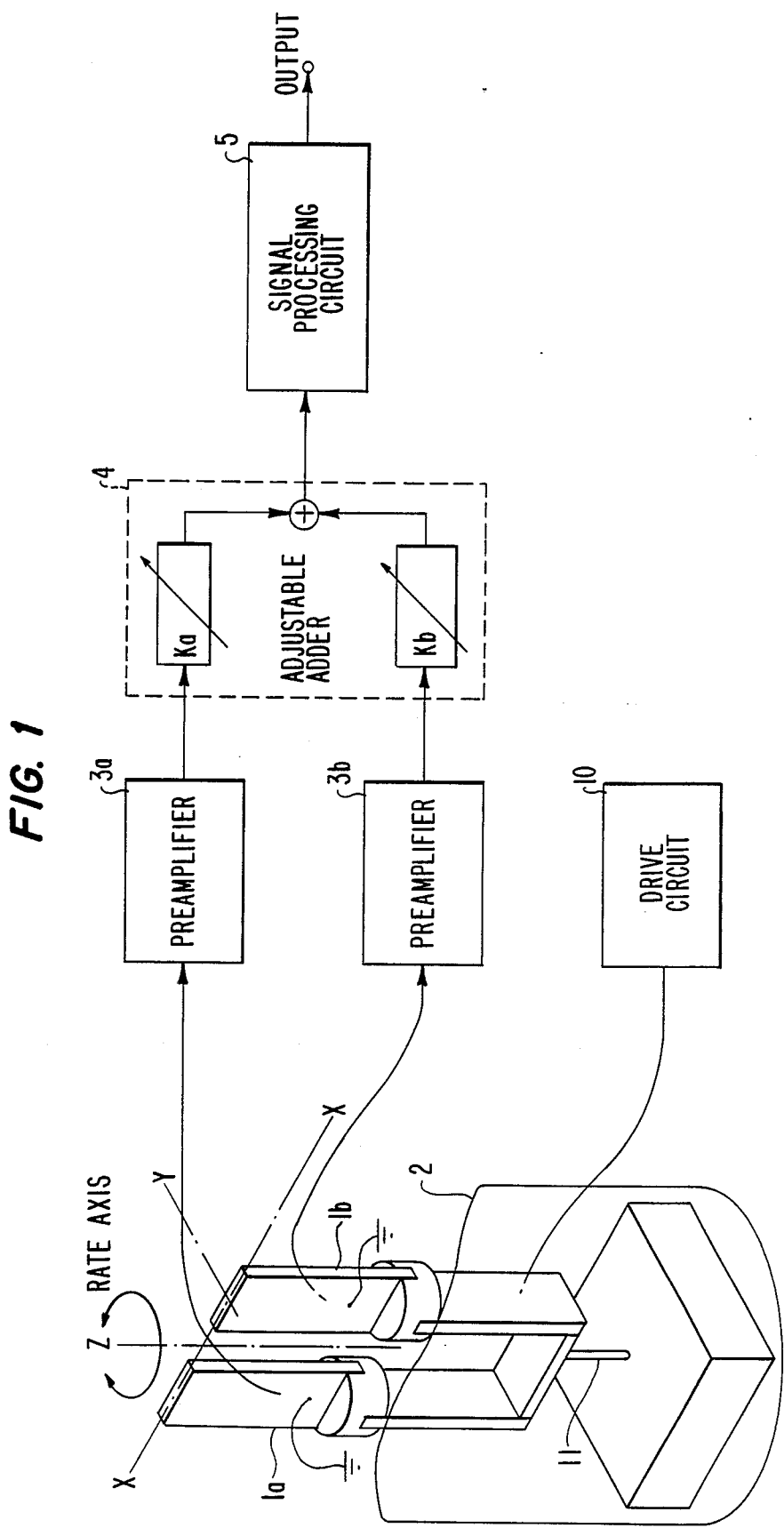
FIG. 1 is a block diagram showing an arrangement in one embodiment of the cyclically driven gyro of the present invention.

FIG. 1 is a block diagram showing an embodiment of the cyclically driven gyro of the present invention. In FIG. 1, a tuning fork structure portion 2 is a drive section to give simple vibration movements symmetrical to each other to rectangular piezoelectric elements 1a and 1b, respectively. It is excited at its resonance frequency fd=1 KHz by a known drive circuit 10. Each of the rectangular piezoelectric elements 1a and 1b becomes a cantilever supported at a joint with the tuning fork structure portion 2. When a force in the direction of its thickness is exerted to its foremost end part, it is bent to generate an electrical output. At this time, it is preferred for the resonant frequency fk of the cantilever to be somewhat larger than the resonant frequency fd of the tuning fork, preferably at least twofold. The reason for this is that the transducer of this kind suddenly loses its accuracy in compensation for the increase in sensitivity in the vicinity of its resonance frequency.

When an angular rate is inputted to the device noted above, there arise Coriolis forces alternately to the foremost ends of the two cantilever type piezoelectric elements in the directions reverse to each other by the aforementioned mechanism, so that the piezoelectric elements 1a and 1b generate electrical outputs proportional to the Coriolis forces. On the other hand, they also produce electrical outputs in response to a disturbance inertia.

Preamplifiers 3a and 3b convert the capacitive, high output impedance outputs of the piezoelectric elements 1a and 1b into low output impedance voltage signals. These signals include, besides the components proportional to the Coriolis force, the components proportional to the disturbance inertia. An adder 4 is used to synthesize the outputs of the preamplifiers 3a and 3b. The adder 4 has an adjusting function that provides weighting factors Ka and Kb, at least one of which is adjustable, to the input signals and adds them with a weighting ratio Ka/Kb adjusted to a desired ratio. By this adjustment of the weighing ratio, it becomes possible to cancel almost perfectly the components proportional to the disturbance inertia, and to send a signal formed by efficiently extracting the component proportional to the Coriolis force to a signal processing circuit 5.

Figure 2:
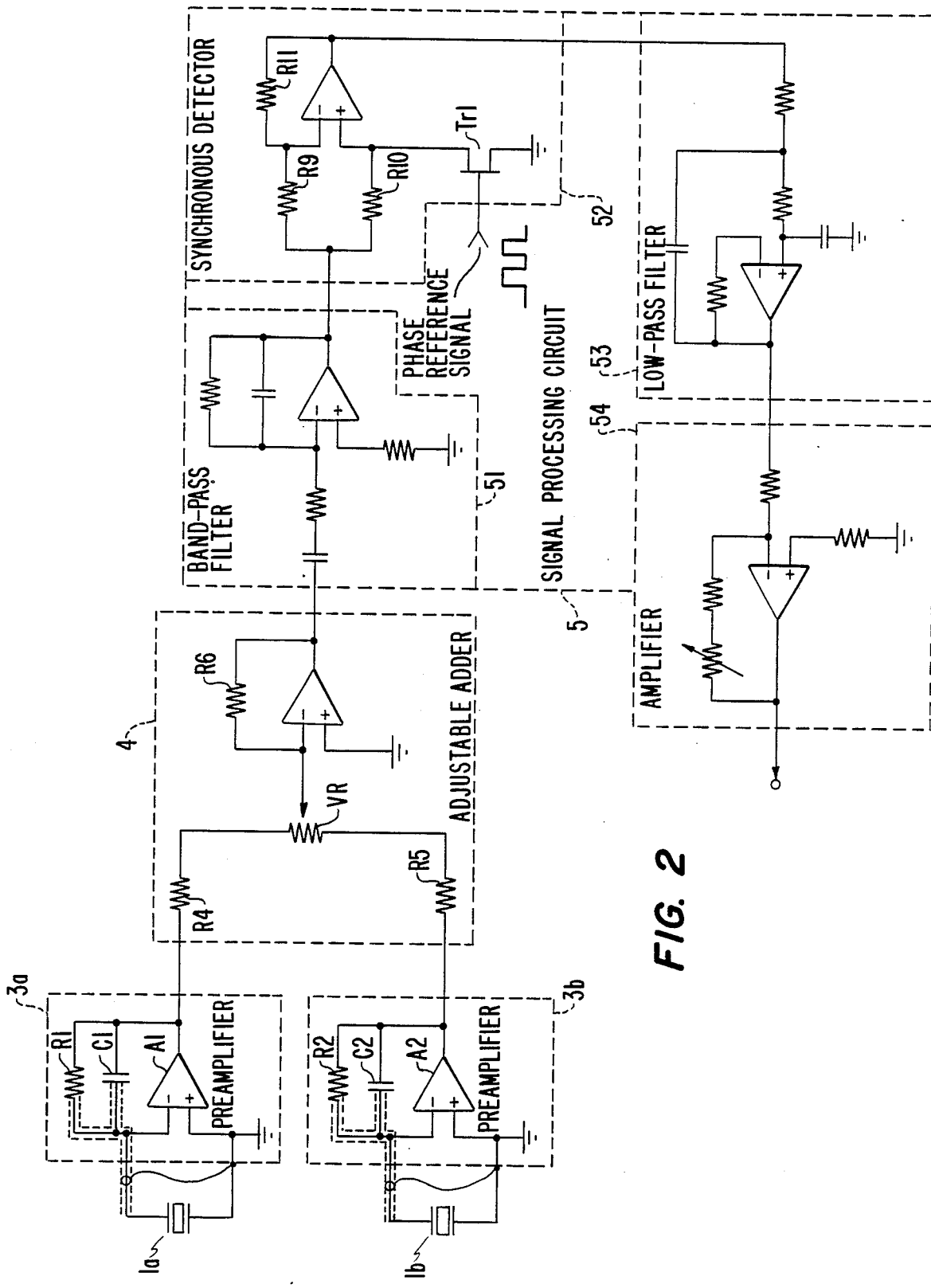
FIG. 2 is a circuit diagram showing a detailed circuit arrangement example of the FIG. 1 embodiment.

FIG. 2 shows a detailed example of the circuit shown in FIG. 1. The circuit operation inclusive of the inside of the signal processing circuit will be explained in detail hereinafter.

In FIG. 2, the preamplifiers 3a and 3b are charge amplifiers having feedback capacitors $C_1$ and $C_2$ respectively, and output electrical signals generated by the piezoelectric elements 1a and 1b as voltages proportional to their short-circuited charges. Here, feedback resistors $R_1$ and $R_2$ are necessary to supply bias currents to the inverted input terminals of operational amplifiers $A_1$ and $A_2$, but they can become factors which inhibit an accurate signal detection. Accordingly, it is desirable for the resistors $R_1$ and $R_2$ to have resistance values which are as large as possible, or, if possible, to be grounded at the middle point via a capacitor so as to enlarge the AC feedback impedance. Furthermore, since this portion is very delicate to deal with very small signals, it is desirable to use a shield wire for each of the lead wires for receiving the signals from the piezoelectric elements and shield at the ground potential, and to use a guard ring at the input part of each amplifier.

With the above constitution, each of the combinations of 1a with 3a and 1b with 3b functions as a sort of acceleration pickup (or inertial force pickup when the own weight of each of the piezoelectric elements 1a and 1b is assumed to be a load mass). Even though an adjusting means is provided, it is desirable to make the best possible effort to obtain the balance of the characteristics to avoid an unnecessary adjusting range.

The adder 4 amplifies and synthesizes the outputs of the preamplifiers 3a and 3b. As shown in the drawing, when the dividing ratio of a variable resistor VR is set to $k:(1-k)$, the respective amplification rates Ka and Kb become: $Ka=R6/\{R4+kVR\}$, $Kb=R6/\{R5+(1-k)VR\}$.

Accordingly, the addition ratio becomes: $Ka/Kb=\{R5+(1-k)VR\}/\{R4+kVR\}$, which is variable by varying k through adjustment of the variable resistor VR.

Now, when the balance is considered in the constitution as mentioned above, the addition ratio Ka/Kb is preferably increased or decreased in the vicinity of 1, and hence, needless to say, it is rational to use an equal value for R4 and R5. In this condition, when $k=\frac{1}{2}$, $Ka/Kb=1$; when $k=0$, $Ka/Kb=1+VR/R4$; and when $k=1$, $Ka/Kb=1/(1+Vr/R4)$, by which the adjusting range can be secured in well balanced state.

In this case, if the VR/R4 is made larger, the above adjusting range becomes broader. However, to make this ratio VR/R4 unnecessarily large to expand the adjusting range too much tends to involve harm such as to make the optimum setting difficult or to give an undesirable effect upon stability after the adjustment. Accordingly, the adjusting range should be limited to the minimum necessary extent. For example, when the imbalance up to ±10% is allowed in the preceding stage, the ratio, VR/R4, may be about 1/9.

According to the constitution as above, fluctuation of the total gain by adjustment can be reduced by a procedure such that, when the gain on one hand is made larger, the gain on the other can be made smaller. Therefore, there is no need to make arbitrary expansion of the adjustment range in the senstivity adjustment (necessary in setting the angular rate sensitivity to a prescribed value) in the following stage.

By the above constitution, the components proportional to the disturbance inertia picked up by the piezoelectric elements 1a and 1b are eliminated at a high precision without depending on the imbalance of the pickup sensitivities, and the signal component proportional to the Coriolis force is efficiently extracted and sent to the signal processing circuit 5. The signal processing circuit 5 is constituted so as to reproduce the input angular rate with a high fidelity.

What is to be recalled here as to the mechanism for generating the Coriolis force is that the Coriolis force has a direction and strength proportional to the vector product of the drive rate and the input angular rate. As to the direction, it will be readily understood that the element constitution as shown in FIG. 1 is made in consideration of it. Accordingly, the Coriolis force, or the signal component obtained by detecting it, appears in the form of modulating the input angular rate with the drive rate. In other words, the signal component has a frequency and phase equal to those of the drive rate, and an amplitude proportional to the input angular rate (and the drive signal amplitude).

In order to examine closely the above contents and realize the aforementioned proposition, frequency identification is effected by a band-pass filter 51 to eliminate unnecessary components far different from the drive frequency. However, it is not desirable for this portion to be provided with too sharp a filter characteristic, but the filter characteristic should be limited to the minimum necessary degree, because it is necessary to send the phase information with a high fidelity to a phase detector of a subsequent stage.

Then, by means of a synchronous detector 52, synchronous detection is effected with the drive rate phase taken as a reference phase. Here, the phase reference signal is either extracted from the tuning fork portion drive circuit 10 or obtained by waveform-shaping a drive rate signal obtained from an external monitoring means into a rectangular form by zero-cross point detection. This synchronous detector 52 is constituted as R9=R11, R10>>R(TrON) (resistance of a transistor Tr1 when ON). When constituted in this manner, the synchronous detector 52 is made to act as an amplifier having a gain $-1$ or a gain 1 according to the ON or OFF state of the transistor Tr1, and consequently it functions as a passing inverting amplifier to be switched by the phase-reference signal. To express this arithmetically, it means to multiply the input signal by the phase reference square wave, or approximately by the drive rate signal.

By this step, a component in which the input angle is recovered from the component proportional to the Coriolis force is produced; the drive inertia componnt having its phase crossing at right angles with the drive rate is converted into the frequency component having twice that of the drive frequency; and the other input frequency components are converted into components of the sum and difference of the drive frequency. Then, by means of a low-pass filter 53 the unnecessary high frequency components can be removed to obtain an output signal proportional to the input angular rate. This output signal is then amplified by an amplifier 54 to a desired sensitivity, thus completing the function as a perfect angular rate sensor.

It will be noted here that the combination of the above synchronous detector 52 and the low-pass filter 53 functions as a very effective band-pass filter. That is to say, the components having frequencies apart from the drive frequency are converted into high frequency components and eliminated by the low pass-filter. This is a reason for that there is no necessity for the band-pass filter 51 to have a sharp filter characteristic.

Next, explanation will be made on the disturbance inertia elimination performance in the above embodiment quantitatively by showing a result of experiment.

Figure 3:
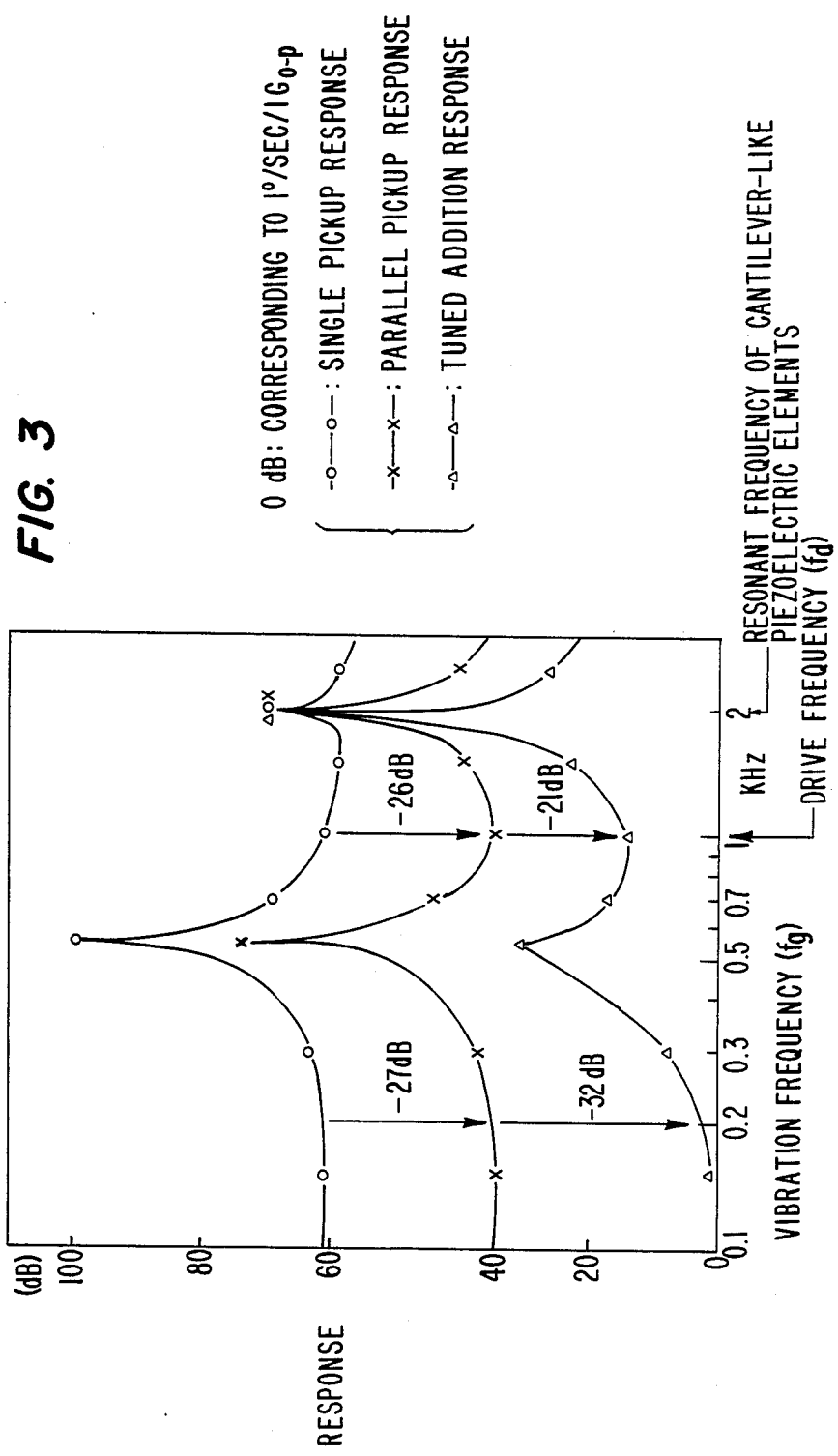
FIG. 3 is a graph showing a result of measurement on the capacity to eliminate the disturbance inertia in the FIG. 1 embodiment.

FIG. 3 is a frequency response characteristic of the error output when the gyro having the constitution as shown in FIG. 1 is provided with a certain disturbance inertia ($1G_{O-P}$) measured at the stage before the signal processing, wherein the abscissa shows a vibration frequency and the ordinate shows its error output converted into the angular rate necessary for generating the Coriolis component having the amplitude equal thereto. That is to say, the value of 0 dB in FIG. 3 means generating an error component having an amplitude equal to an angular rate input of 1°/sec. with respect to a disturbance input of $1G_{O-P}$. Note that, as to the absolute value of this response, when the drive level is varied, the Coriolis force generated per unit input angular rate varies, with the result that the above value which has been normalized by the unit angular rate input also varies.

What is to be noted in FIG. 3 is the relative values of the three curves shown there, which realistically show the disturbance inertia removing capability of the cyclically driven gyro of the present invention.

In FIG. 3, the curve shown by circles (○) and solid lines denotes the response when only a single sheet of piezoelectric element is used as a pickup, which are to be called a "single pickup response". The curve shown by cross marks (X) and solid lines denotes the response when a pair of pickups are provided and their outputs are connected in parallel and synthesized. The conventional apparatuses are similar to this type. This is to be called a "parallel pickup response". The curve shown by delta marks (Δ) and solid lines denotes the response when an adjustment has been completed by the constitution of the present invention, which is to be called a "tuned addition response".

The interesting points here are first that each response differs between the zone lower than the vibration frequency of about 1.5 KHz and the zone higher than the same, and second that first and second peaks exist at the points near 550 Hz and near 2 KHz of the vibration frequency. Here, the first peak is produced by the resonance of a support pin 11 in the constitution shown in FIG. 1, and the second peak by the resonance of the aforementioned cantilevers. At this stage (i.e., before signal processing) the existence of such peaks per se is not a significant problem, because they are far apart from the drive frequency fd=1 KHz and can be readily eliminated. As to this point, detailed description will be given later.

In the frequency zone lower than about 1.5 KHz, the parallel pickup response and the tuned addition response apparently show attenuation in comparison with the single pickup response, and they show a loss in their attenuation effects in a frequency range higher than that. This is closely related to the aforementioned resonance of the cantilevers. That is to say, in the zone near its resonance, the two cantilever-like piezoelectric elements not only increase their sensitivities but also cause phase rotations of the outputs corresponding to the acting force and a difference between the two. Their addition becomes no longer scholastic, and the cancellation effect is reduced, with the result that the phases are reversed with to each other at the resonance point. This loss of the cancellation effect becomes more remarkable as the original cancellation effect is larger.

In order to prevent such a loss of cancellation effect in the vicinity of the drive frequency, it is necessary, as described above, to choose the cantilever resonance frequency fk so as to be considerably larger (i.e. more than twofold) than the drive frequency fd.

The reason why an emphasis is made on the behaviors in the vicinity of the drive frequency is because the deviation in its range cannot be compensated for by the signal processing in the subsequent stage, and accordingly is most sensitive in the most adequately constituted apparatus. Leaving this matter for review in detail later, a discussion follows on the area near the drive frequency.

In this area, the parallel pickup response shows an attenuation effect of about −26 dB, or 1/20, in comparison with the single pickup response. Although this shows an effectiveness of the symmetric driving, it suggests a limit of the case where a simple addition is employed such as to make a mere parallel connection.

Here, the value of −26 dB, when considered from the abovementioned viewpoint of balance, means an imbalance of 10%. That is to say, it means that there is a difference of 10% in the sensitivities of the pair of pickups. And, as the precision to be sought for the pickup sensitivity of this kind, the difference to this extent is not regarded as an excessively large value.

The tuned addition response shows an attenuation effect of more than −20 dB in comparison with the parallel pickup response, or even more than −46 dB in comparison with the single pickup response. This is equivalent to the realization of imbalance of 1% or less due to the improvement of balance by further one figure in the parallel response.

Considering the difficulty of the scheme to realize a balance of an order of about 1% by enhancing the precision of each of the constituting elements of the apparatus, it is apparent how effective the present invention is.

As noted above, description has been made on the embodiment of using the drive by tuning fork vibration and the pickups by cantilever-like piezoelectric elements. The above noted principle can be applied to any such system using a symmetrical drive to detect the Coriolis force which acts on the two driven mass elements to detect the angular rate. For example, a tuning fork vibration driver and an electromagnetic means or a capacitance detection means for each pickup may be used. Alternatively, the drive may be effected not by using a simple harmonic motion but by using a rotary drive effected by two-dimensionally synthesizing two simple harmonic motions.

With respect to the means of synthesizing the two outputs in an adjustable manner, any means that can realize the function may be adopted without being limited to the means as shown in FIG. 2. For example, it may be so designed that the gain of one preamplifier is fixed and the gain of the other is made variable, and each of them is added at the fixed ratio (e.g., 1:1), or there may be a means of realizing the function through a linked adjustment of the two. Needless to say that the means are not limited to the example of the circuit shown in FIG. 2.

Since sufficient explanation has been made on the constitution, action, and effect of the cyclically driven gyro of the present invention by the above description on one embodiment, a detailed description is provided below on the adjusting system thereof.

Figure 4:
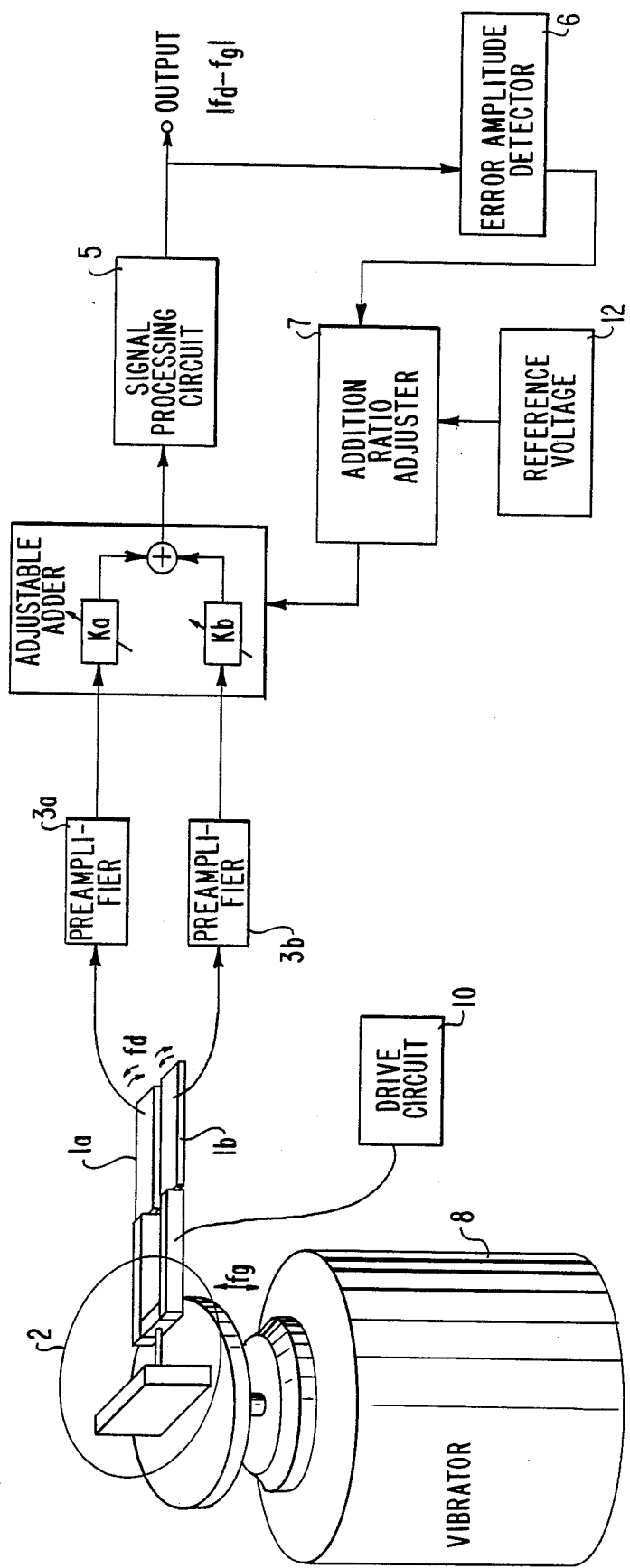
FIG. 4 is a block diagram showing an embodiment of the adjusting system for the cyclically driven gyro of the present invention.

FIG. 4 is a block diagram showing one embodiment of the adjusting system of the cyclically driven gyro of the present invention. In FIG. 4, a vibrator 8 gives a disturbance inertia having a frequency fg near the drive frequency fd (preferably the frequency fg is chosen such that the difference |fg−fd| can pass through the low-pass filter after the synchronous detection) to the gyro in its operating condition in the direction of thickness of the cantilevers 1a and 1b, i.e., in the direction of sensitivity. Here, the reason why the direction of vibration is set in the direction of sensitivity of the cantilevers 1a and 1b is because the gyro is the most sensitive to the disturbance in such a direction, and accordingly the adjustment can be done readily and in at a high precision. The piezoelectric elements 1a and 1b generate output signals of the frequency fg in response to the disturbance inertia. These signals are converted into voltage signals by the preamplifiers 3a and 3b and fed to the adder 4. By the addition, the components proportional to the abovementioned disturbance inertia are cancelled to reduce their values, but the portions not satisfactorily cancelled are inputted to the signal processing circuit 5. In the signal processing circuit 5, the distrubance component has its frequency in the vicinity of the frequency of the Coriolis component which is the subject of detection. Therefore, it cannot be attenuated by a simple frequency discriminating means but is amplified on the same basis as the Coriolis component and is subjected to synchronous detection.

By the aforementioned synchronous detection, the disturbance component has its frequency changed into the frequency components fd+fg, fd−fg and which are the sum and difference frequency components with respect to the drive frequency fd. In this case, the sum frequency component fd+fg is rapidly attenuated by the low-pass filter and scarcely appears in the final output. But, since the difference frequency component (fd−fg) is in the passing range of the low-pass filter, it passes straight through the low-pass filter and is amplified to the same extent as the Coriolis component so as to appear in the final output.

An error amplitude detector 6 detects the amplitude of this error response and sends an error amplitude signal proportional to the error amplitude to an addition ratio adjuster 7. The addition ratio adjuster 7 functions to compare this error amplitude signal with a reference voltage 12 and to adjust the addition ratio of the adder 4 so as to make the error amplitude signal lower than the reference voltage. As the means of adjustment, there may be cases where a variable resistor is used and its resistance value is adjusted by rotating with a driver or a motor, or where a fixed resistor is used and its resistance value is adjusted by means such as laser trimming, sand blast trimming, etc.

Also, the rationality to set the disturbance vibration frequency fg in the vicinity of the drive frequency fd can be understood by closely examining the above explanation. This is because the signal treating circuit 5 cannot have a capacity to separate the disturbance component from the Coriolis component to eliminate it, but responds most sensitively to the disturbance component.

As an example, consideration will be made on an embodiment which has previously been shown. What is first to be noted in observing the frequency response shown in FIG. 3 will be the peaks appearing in the vicinity of 530 Hz and 2 KHz. These are due to the resonance of the supporting pin which supports the tuning fork structure in the constitution shown in FIG. 1 and the resonance of the cantilever piezoelectric element, and their values are larger by about 40 dB and 60 dB respectively than those near the drive frequency.

However, the frequency response as shown in FIG. 3 is that before the signal processing. By appropriately designing the signal processing circuit 5, the response at the final output stage to the disturbance near these frequencies can be largely attenuated.

Firstly, consideration will be made on the selection at the frequency of 550 Hz. In consideration of the phase fidelity, it is assumed that one can not expect to attenuate the frequency by a simple frequency discrimination. Then, at the stage of input to the synchronous detector, the relative response value becomes approximately equal to that shown in FIG. 3. By the aforementioned synchronous detection operation, the 550 Hz component is converted into the components of the sum with and difference from the drive frequency 1 KHz, i.e., into 1550 Hz and 450 Hz. Here, when, for example, the low-pass filter in the subsequent stage is so designed as to have a cutoff frequency of 50 Hz in 4 order, the sum and difference components are attenuated respectively to about $-120$ dB (1/1,000,000) and about $-76$ dB (1/6300). Accordingly, it is possible to make the response appearing in the final output eventually lowered to 1/10,000 and 1/63, respectively in comparison with those of the disturbance in the vicinity of the drive frequency. Also, the peak at 2 KHz can also be attenuated to an allowable level in a similar manner.

As noted above, an explanation has been given on the basis of the preferred embodiment. Such properties as to show responses most sensitively to the disturbances in the vicinity of the drive frequency are common to all cyclically driven gyros. They are not specific to the embodiment shown herein but are the essential results to be obtained when intended to effect the angular rate detection with the highest precision and efficiency in reflection of the mechanism of generation of Coriolis force.

As apparent from the foregoing detailed description, according to the adjusting system of the cyclically driven gyro of the present inention, adjustment can be effected to the most sensitive input to the apparatus, and therefore it is possible to evaluate the characteristics of the apparatus correctly and realize the desired characteristics with a good precision and simplicity.

What is claimed is:

1. A cyclically driven gyro comprising:
   a pair of mass elements which are symmetrically driven cyclically in opposite directions with respect to each other;
   a pair of deflection detection means which independently detect forces acting on said pair of mass elements in response to an input angular rate and output deflection detection signals;
   an adjustable addition means which adds said deflection detection signals with a desired ratio and outputs an added signal said adjustable addition means being constituted so that contribution rates of said deflection detection signals with respect to the added signal vary in linkage in such manner that when one of the contribution rates is increased the other of the contribution rates decreases so as to keep a total gain of said adjustable addition means constant; and
   a signal processing circuit which processes said added signal to generate an output signal in proportion to the input angular rate.

2. A cyclically driven gyro according to claim 1, wherein a resonance frequency of said deflection detecting means is at least twice a frequency of the cyclic motion of the mass elements.

3. An adjusting system for a cyclically driven gyro comprising:
   a pair of mass elements which are symmetrically driven cyclically in opposite directions with respect to each other;
   a pair of deflection detection means which independently detect forces acting on said pair of mass elements in response to an input angular rate and output deflection detection signals;
   an adjustable addition means which adds said deflection detection signals with a desired ratio and outputs an added signal;
   a signal processing circuit which processes said added signal to generate an output signal in proportion to the input angular rate;
   a vibration means which vibrates at a frequency in the vicinity of a drive frequency of said mass elements in a sensitivity direction of said deflection detection means;
   a means for detecting an error response from the output signal of said signal processing circuit so as to generate an error amplitude signal; and
   an adjusting means which adjusts an addition ratio of said adjustable addition means so that said error amplitude signal becomes within a prescribed range.

* * * * *